(12) United States Patent
Zhang et al.

(10) Patent No.: US 11,224,092 B2
(45) Date of Patent: Jan. 11, 2022

(54) METHOD AND APPARATUS FOR RESETTING MEDIUM ACCESS CONTROL LAYER

(71) Applicants: SHARP KABUSHIKI KAISHA, Sakai (JP); FG INNOVATION COMPANY LIMITED, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/632,828

(22) PCT Filed: Jul. 25, 2018

(86) PCT No.: PCT/CN2018/097011
§ 371 (c)(1),
(2) Date: Jan. 21, 2020

(87) PCT Pub. No.: WO2019/024735
PCT Pub. Date: Feb. 7, 2019

(65) Prior Publication Data
US 2020/0154513 A1 May 14, 2020

(30) Foreign Application Priority Data
Aug. 2, 2017 (CN) .......................... 201710655146.3

(51) Int. Cl.
*H04W 80/02* (2009.01)
*H04L 5/00* (2006.01)
*H04W 48/08* (2009.01)
*H04W 36/08* (2009.01)
*H04W 74/08* (2009.01)

(52) U.S. Cl.
CPC ........... *H04W 80/02* (2013.01); *H04L 5/0055* (2013.01); *H04W 36/08* (2013.01); *H04W 48/08* (2013.01); *H04W 74/0833* (2013.01)

(58) Field of Classification Search
None
See application file for complete search history.

(56) References Cited

U.S. PATENT DOCUMENTS

2012/0244866 A1 9/2012 Ou et al.
2018/0270868 A1* 9/2018 Ou ...................... H04W 72/042

OTHER PUBLICATIONS

NTT DOCOMO, "New SID Proposal: Study on New Radio Access Technology", RP-160671, 3GPP TSG RAN Meeting #71, Goteborg, Sweden, Mar. 7-10, 2016.

(Continued)

*Primary Examiner* — Hong S Cho
(74) *Attorney, Agent, or Firm* — ScienBiziP, P.C.

(57) ABSTRACT

The present disclosure provides a method for resetting a medium access control (MAC) layer at user equipment (UE). The method comprises transmitting a system information request message for requesting system information to a network side through a random access procedure; and resetting the MAC layer when the system information is unsuccessfully requested. Embodiments of the present disclosure further provide a corresponding apparatus.

4 Claims, 3 Drawing Sheets

(56) References Cited

OTHER PUBLICATIONS

Huawei, Hisilicon, "On demand SI acquisition and failure handling", R2-1706768, 3GPP TSG-RAN WG2 NR adhoc#02, Qingdao, China, Jun. 27-29, 2017.
Samsung, "On Demand SI: Remaining Issues", R2-1706527, 3GPP TSG-RAN WG2 NR#2, Qingdao, China, Jun. 27-29, 2017.
ZTE Corporation, "Cell reselection during on-demand system information acquisition", R2-1809657, 3GPP TSG-WG2 Meeting #AH-1807, Montreal, Canada, Jul. 2-6, 2018.
Asustek, "UE actions upon cell reselection in RRC_INACTIVE", R2-1709332, 3GPP TSG-RAN WG2 Meeting #99, Berlin, Germany, Aug. 21-25, 2017.
Meng-Hui Ou et al., "Method and Apparatus for Random Access Procedure for System Information Request in a Wireless Communication System", U.S. Appl. No. 62/473,684, filed Mar. 20, 2017.
Huawei, "Comments on 36.331 Running CR to capture agreements on NB-IoT", R2-162968 3GPP TSG-RAN WG2#93 Meeting, Dubrovnik, Croatia , Apr. 11-15, 2016.
ZTE, "On-demand SI Error handing", R2-1704675 3GPP TSG-RAN WG2 meeting #98, Hangzhou, China, May 15-19, 2017.
3GPP TS 36.321 V14.2.0 (Mar. 2017) 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V14.2.0 (Mar. 2017) 3rd Generation Partnership Project; Technical Specification Group Radio Access Network; Evolved Universal Terrestrial Radio Access (E-UTRA); Radio Resource Control (RRC); Protocol specification (Release 14).

\* cited by examiner

METHOD AND APPARATUS FOR RESETTING MEDIUM ACCESS CONTROL LAYER

TECHNICAL FIELD

The present invention relates to the field of wireless communications technologies. More specifically, the present invention relates to a method and an apparatus for resetting a medium access control layer.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, a research subject on the new 5G radio access technology was proposed at the 3rd Generation Partnership Project (3GPP) RAN #64 plenary meeting held in March 2016 (see non-patent literature: RP-160671 New SID Proposal: Study on New Radio Access Technology). In the description of the work item, the operating frequency band of future new communication RATs can be expanded to 100 GHz, which will satisfy at least the following needs: the demand for enhanced mobile broadband services, communication needs between massive Internet of Things terminals, and business needs with high reliability requirements. The research of the item is expected to come to an end in 2018.

In a 5G system, UE may obtain required system information through a request. The request process may be as follows: the UE transmits a preamble to a network side (such as a base station or any other network-side device capable of transmitting system information). After receiving the preamble, the network side transmits system information corresponding to the preamble on a predefined time-frequency resource. In order to transmit a preamble related to a system information request to the network side, a random access procedure is triggered at a MAC layer. Due to radio link environment instability, if no response from the network side is received, the UE repeatedly transmits the preamble until the maximum number of transmissions is reached or exceeded. In this case, how to enable the UE to correctly acquire system information becomes an issue.

SUMMARY

In view of this, the present disclosure provides a method and an apparatus for resetting a medium access control (MAC) layer at user equipment (UE), and a computer-readable storage medium.

According to one aspect of embodiments of the present invention, a method for resetting a medium access control (MAC) layer at UE is provided. The method comprises transmitting a system information request message for requesting system information to a network side through a random access procedure; and resetting the MAC layer when the system information is unsuccessfully requested.

In some examples, the resetting the MAC layer when the system information is unsuccessfully requested may comprise resetting the MAC layer if no acknowledgment related to the system information request message is received from the network side within a predefined time period. In some other examples, the resetting the MAC layer when the system information is unsuccessfully requested may comprise resetting the MAC layer if a random access problem occurs in the random access procedure.

In some examples, the method may further comprise directly resetting the MAC layer if the UE performs cell reselection during the predefined time period.

In some examples, the method may further comprise judging whether a reselected cell is an inaccessible or barred cell if the UE performs cell reselection during the predefined time period, and resetting the MAC layer when the reselected cell is an inaccessible or barred cell.

In some examples, the predefined time period may begin at one of the following moments:

when the transmitting a system information request message is triggered;

when a preamble for requesting system information is transmitted;

when initialization of the random access procedure by a lower layer is triggered;

when initialization of a preamble transmission procedure by the lower layer is triggered;

when transmission of the preamble is instructed to the lower layer; or when the MAC layer instructs acquisition of the system information to a radio resource control (RRC) layer.

In some examples, whether or not to enable the predefined time period may be judged according to the state of the UE.

In some examples, the enabling of the predefined time period may further be based on the type of the system information request message.

In some examples, the resetting the MAC layer may comprise at least one of the following:

discarding information related to a preamble transmitted in the random access procedure;

discarding information related to a random access resource used in the random access procedure;

flushing a buffer of the UE;

stopping all timers running at the MAC layer;

stopping all ongoing random access procedures; or releasing a network identifier of the UE and related information thereof.

In some examples, the method may further comprise the following: when the system information to be acquired is information of lower importance, suspending the predefined time period and stopping the request for the system information, and reinitiating the request for the system information after a second predefined time period.

In some examples, the system information request message is Message 3 in a Long Term Evolution (LTE) random access procedure. The method may further comprise the following: when no acknowledgment for the system information is received from the network side, or when an instruction of delaying/prohibiting transmission of the system information request message is received from the network side and the instruction comprises information related to a duration of delaying/prohibiting transmission, suspending the predefined time period and stopping the request for the system information, and reinitiating the request for the system information after a third predefined time period which corresponds to the information related to the duration of delaying/prohibiting transmission.

According to another aspect of the embodiments of the present invention, an apparatus for resetting a medium access control (MAC) layer at user equipment (UE) is provided. The apparatus comprises a system information request module and a MAC layer reset module. The system information request module is configured to transmit a system information request message for requesting system information to a network side through a random access procedure. The MAC layer reset module is configured to reset the MAC layer when the system information is unsuccessfully requested.

According to another aspect of the embodiments of the present invention, an apparatus for resetting a medium access control (MAC) layer at user equipment (UE) is provided, the apparatus comprising a memory and a processor. The memory stores computer-executable instructions. The processor executes the computer-executable instructions stored in the memory to execute the method described above.

According to another aspect of the embodiments of the present invention, a computer-readable storage medium is provided. The computer readable medium has executable instructions stored thereon, wherein the instructions, when executed by the processor, cause the processor to execute the method described above.

BRIEF DESCRIPTION OF THE DRAWINGS

The foregoing features and advantages of the present disclosure will be made more apparent from the following detailed description of embodiments of the present disclosure when taken in conjunction with the accompanying drawings below.

DETAILED DESCRIPTION

Figure 1:
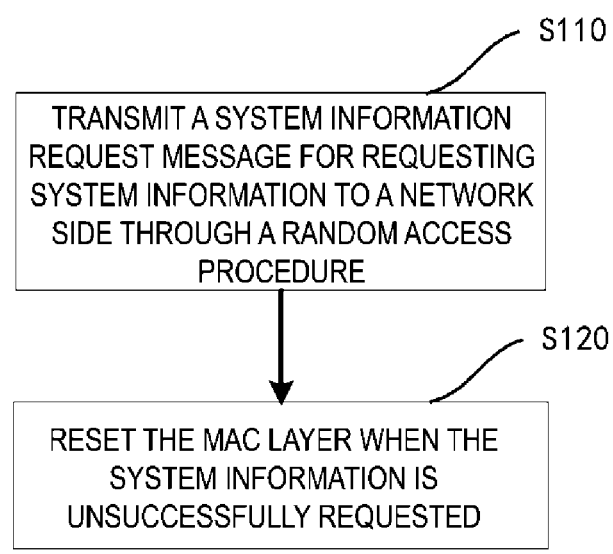
FIG. 1 is a brief flowchart of a method for handling the aforementioned problem according to an embodiment of the present invention.

The following describes the present invention in detail with reference to the accompanying drawings and specific embodiments. It should be noted that the present invention is not limited to the specific embodiments described below. In addition, for simplicity, detailed description of the prior art not directly related to the present invention is omitted to avoid confusion with respect to the understanding of the present invention.

A plurality of embodiments according to the present invention are specifically described below by using an LTE mobile communications system and its subsequent evolved version as an exemplary application environment. However, it should be noted that the present invention is not limited to the following embodiments. The present invention is applicable to other wireless communications systems such as the forthcoming 5G cellular communications system, as well as other network-side devices and terminal devices such as network-side devices and terminal devices supporting eMTC, MMTC, and the like.

Prior to the specific description, several terms mentioned in the present invention are illustrated as follows. The terms involved in the present invention shall have the meanings set forth below, unless otherwise indicated:

UE: User Equipment/terminal device
MAC: Medium Access Control
RRC: Radio Resource Control, which is equivalent to radio resource control
Preamble: preamble
SIB: System Information Block
SI: System Information
RAPID: Random Access Preamble Identifier
C-RNTI: Cell Radio Network Temporary Identifier In an LTE mobile communications system, there are two modes that UE acquires system information. In the first mode, a network side (for example, a base station) broadcasts system information, and the UE receives the broadcast system information to acquire system information content. In the second mode, system information is acquired in an on-demand mode. The on-demand mode means that the UE transmits, to the base station/network, a system information request message which requests to acquire system information. The system information request message may specifically include a specific preamble, a preamble corresponding to a specific system information type, or an RRC message. After receiving the request message, the network side/base station transmits the system information in a broadcast mode at a specific moment, and the UE receives the broadcast system information at a corresponding moment to acquire system information content. Therefore, system information acquired in the on-demand mode may also be referred to as on-demand system information.

In the on-demand mode, a random access procedure is required no matter whether a preamble or an RRC message is transmitted. The system information acquisition may be specifically based on Message 1 or Message 3.

In the process of acquiring system information based on Message 1, the UE triggers a random access procedure to transmit a preamble to the network side/base station, where the preamble may correspond to one or a plurality of pieces of system information to be acquired by the UE or correspond to one or a plurality of SIBs to be acquired by the UE. After receiving the request, if resources permit, then the network side/base station carries an RAPID of the preamble in a returned random access response (RAR) to indicate that the system information request of the UE is acknowledged. After receiving the RAPID in the RAR, the UE may consider that the random access is successfully completed and receive the system information in a corresponding system information window.

In the process of acquiring system information based on Message 3, the UE may also trigger a random access procedure to transmit a preamble to the network side/base station. Unlike the case of Message 1, in the returned RAR, the network side/base station allocates a UL grant to the UE to resolve a contention conflict. Also, unlike the case of Message 1, the UE transmits Message 3, i.e., a message carrying a requested message type. After receiving the request, the network side/base station may acknowledge the system information request of the UE in Message 4. At this time, the UE may consider that the random access is successfully completed and may receive the system information in a corresponding system information window.

In the aforementioned random access procedure, due to the instability of the radio link environment, if no acknowledgment from the network side is received, the UE repeatedly transmits the preamble until the maximum number of transmissions is reached or exceeded. How to enable the UE to correctly acquire system information in such a case becomes an issue.

The following embodiments are made to solve this issue. Several embodiments of the present invention will be described in detail below.

Embodiment 1

FIG. 1 is a brief flowchart of a method for handling the aforementioned issue according to an embodiment of the present invention. This method solves the issue of system information request failure by resetting a MAC layer.

As shown in FIG. 1, the method includes operation S110: transmitting a system information request message for requesting system information to a network side through a random access procedure. For example, the system information request message may be sent in the mode described above.

In operation S120, the MAC layer is reset when the system information is unsuccessfully requested.

In some examples, the resetting the MAC layer when the system information is unsuccessfully requested may include: resetting the MAC layer if no acknowledgement related to the system information request message is received from the network side within a predefined time period. Optionally, the predefined time period described above may be implemented using a timer, for example, using a timer of an RRC layer. The time period begins when the timer is initiated; the time period ends when the timer expires; and the time period is suspended when the timer is stopped.

In some examples, the resetting the MAC layer when the system information is unsuccessfully requested may include resetting the MAC layer if a random access problem occurs in the random access procedure. The random access problem may refer to any problem causing failure of the random access procedure.

In some examples, the method may further include: directly resetting the MAC layer if the UE performs cell reselection during the predefined time period. However, in some other examples, different processing modes may exist. For example, it is judged whether a reselected cell is an inaccessible or barred cell if the UE performs cell reselection during the predefined time period; and the MAC layer is reset when the reselected cell is an inaccessible or barred cell.

In some examples, the predefined time period begins at one of the following moments (that is, the corresponding timer is initiated at one of the following moments):

when transmission of the system information request message is triggered;

when a preamble for requesting system information is transmitted;

when initialization of the random access procedure by a lower layer is triggered;

when initialization of a preamble transmission procedure by the lower layer is triggered;

when transmission of the preamble is instructed to the lower layer; or when the MAC layer instructs acquisition of the system information to an RRC layer.

In the embodiments of the present disclosure, unless otherwise specified, an upper layer (higher layer) usually refers to the RRC layer, and a lower layer usually refers to the MAC layer.

In some examples, whether or not to enable the predefined time period (for example, whether or not to initiate the corresponding timer) may depend on the current state of the UE. For example, the predefined time period is enabled when the UE is in an Idle state or Inactive state, and the predefined time period is not enabled when the UE is in a Connected state, or vice versa.

In some examples, the enabling of the predefined time period may further be based on the type of the system information request message. For example, the predefined time period may be enabled if the system information request message is Message 1, and the predefined time period is not enabled if the system information request message is Message 3, and vice versa.

In some examples, the resetting the MAC layer includes at least one of the following operations:

discarding information related to a preamble transmitted in the random access procedure;

discarding information related to a random access resource used in the random access procedure;

flushing a buffer of the UE;

stopping all timers running at the MAC layer;

stopping all ongoing random access procedures; or releasing a network identifier of the UE and related information thereof.

In some examples, the method shown in FIG. 1 may further include the following: when the system information to be acquired is information of lower importance, suspending the predefined time period and stopping the request for the system information. The method may further include reinitiating the request for the system information after a second predefined time period. Similarly, the second predefined time period herein may be implemented by, but not limited to, a timer (a second timer).

In some examples, the aforementioned system information request message is Message 3 in a Long Term Evolution (LTE) random access procedure. In this case, the method shown in FIG. 1 may further include the following: when no acknowledgment for the system information request is received from the network side, or when an instruction of delaying/prohibiting transmitting of the system information request message is received from the network side and the instruction includes information related to a duration of delaying/prohibiting transmission, suspending the predefined time period and stopping the request for the system information. The method may further include reinitiating the request for the system information after a third predefined time period corresponding to the information related to the duration of delaying/prohibiting transmission. Similarly, the third predefined time period herein may be implemented by, but not limited to, a timer (a third timer). The description will not be provided herein again.

The aforementioned solution will be described in more detail with reference to the description of the following specific embodiments. In the following description of the specific embodiments, description is made mainly based on a timer. However, it should be understood that the aforementioned predefined time period may also be implemented in any other modes, not just using a timer.

Embodiment 2

The UE may initiate a first timer when the UE acquires system information. Optionally, the system information may be on-demand system information, and the on-demand system information refers to system information that needs to be acquired in an on-demand mode. Optionally, the timer may be a timer managed by an RRC layer. The duration setting of the timer may be broadcast by the network side in the system information. The UE may configure the first timer according to the duration of the timer.

A MAC layer is reset when the first timer expires. In the case that the timer is managed by the RRC layer, a MAC layer reset may be instructed by the RRC layer.

When the first timer expires, it may be judged that the system information acquisition is unsuccessful; more specifically, it may be judged that the on-demand system information is unsuccessfully acquired. In this case, actions performed by the UE after it is judged that the system information is unsuccessfully acquired include resetting the MAC layer.

Embodiment 3

This embodiment differs from Embodiment 1 in that cell reselection may occur during running of a first timer. In this embodiment, when cell reselection occurs during running of the first timer, the UE stops the first timer. A MAC layer may be directly reset while or after the first timer is stopped. In some examples, actions performed by the UE when the first timer is stopped may also include at least resetting the MAC layer; that is, the MAC layer may be indirectly reset when the first timer is stopped. The actions or operations performed by the UE herein may further include, but not limited to, instructing or notifying unsuccessful acquisition of system information to an application layer or a non-access stratum of the UE. The application layer or non-access stratum disables, deactivates, or does not enable one or a plurality of UE functions based on the notification or instruction, where the enabling of these functions may be based on the system information to be acquired. The unsuccessful acquisition of the system information causes the UE to not enable the function.

In some examples, during running of the first timer, the UE may stop the first timer when a reselected/selected cell is determined/considered to be inaccessible or barred. In addition, the "inaccessible" or "barred" may adopt the conventional definition in the art and will not be described herein again. Similarly, the MAC layer may be directly reset while or after the first timer is stopped. In some examples, actions performed by the UE when the first timer is stopped may also include resetting the MAC layer, that is, the MAC layer may be indirectly reset when the first timer is stopped.

The selected cell may be a cell that the UE currently resides in, or may be a cell from which the UE acquires the system information, or a cell that provides the required system information to the UE. The process of determining the selected cell to be inaccessible may include the following: the UE may determine the cell to be inaccessible if the UE receives a random access problem indication in the process of acquiring the system information from the selected cell (for example, in an on-demand mode) or during running of the first timer. The instruction may be an instruction sent from a lower layer to an upper layer, for example, but not limited to, an instruction sent from the MAC layer to an RRC layer, or may be any indication indicating a random access problem sent from a lower layer to an upper layer in an OSI structure.

In addition, the UE may further determine a reset of the MAC layer according to the type of the system information to be acquired. For example, the following applies when the system information to be acquired is important or essential information: if a random access problem indication is received during acquisition of the system information or during running of the first timer, it may be determined that the current cell is inaccessible, and then the first timer is stopped and the MAC layer is reset. Moreover, the following applies when the system information to be acquired is less important or non-essential information: if a random access problem indication is received during acquisition of the system information, the first timer may further be stopped and a second timer may be initiated. The acquisition flow of the system information is not initiated (for example, a system information request message is not sent) during running of the second timer. When the second timer expires, the UE may reinitiate the flow of acquiring system information (for example, the flow in Embodiment 2). For example, the first timer may be initiated again; or, the MAC layer may be reset when the first timer expires.

In some examples, the first timer may further be stopped when information indicating that the requested system information is acknowledged is received. The receiving information indicating that the requested system information is acknowledged may be the following: the MAC layer indicates to the upper layer (for example, the RRC layer) that the requested system information is acknowledged, or the MAC layer indicates to the upper layer that a transmitted preamble is acknowledged in an RAR, or the MAC layer feeds back an RAPID (for example, the RAPID may be received in the RAR) to the upper layer, or the MAC judges that a random access procedure is successfully completed, or the like. In some further examples, the first timer may be stopped when the system information is received. The system information herein may be the requested system information (for example, system information requested in an on-demand mode). In both cases, optionally, the MAC layer may also be reset to refresh the MAC.

Embodiment 4

The "when the UE acquires system information" in the aforementioned embodiment may specifically refer to the following initiation timings of the first timer:

when transmission of the system information (for example, system information acquired in an on-demand mode) request message is triggered;

when a preamble for requesting system information is transmitted;

when initialization of the random access procedure by a lower layer is triggered;

when initialization of a preamble transmission procedure by the lower layer is triggered;

when transmission of the preamble is instructed to the lower layer; or when the MAC layer instructs acquisition of the system information to an RRC layer.

On the premise that one of the initiation timings of the first timer described above is fulfilled, or before judging whether these initiation timings are fulfilled, the UE may optionally further judge whether or not to initiate the first timer according to a state of the UE, namely, according to the state of the UE, judging whether or not to initiate the predefined time period described above. For example, the first timer may be initiated when the UE is in an Idle state (RRC_IDLE or Idle mode) or Inactive state (RRC_INACTIVE or Inactive mode), and the first timer is not initiated when the UE is in a Connected state (RRC_ACTIVE or RRC_CONNECTED or Connected mode), or vice versa.

For example, the first timer may be initiated when the UE acquires system information and when the UE is in the Idle state or Inactive state.

For example, the first timer is initiated when transmission of an on-demand system information request is triggered and when the UE is in the Idle state or Inactive state.

For example, the first timer is initiated when the UE instructs transmission of a preamble to the lower layer and when the UE is in the Idle state or Inactive state.

In addition, in some examples, the UE may further judge whether or not to initiate the first timer according to the adopted mode of acquiring system information (for example, the type of a system information request message). For example, the first timer may be initiated when the mode based on Message 1 is adopted, the first timer may not be initiated when the mode based on Message 3 is adopted, and vice versa.

Embodiment 5

Regarding the resetting the MAC layer through a timer expiration or stopping a timer according to the above embodiments, there may be other possible expressions. Some of these expressions are provided in this embodiment. It should be noted that there are other expressions expressed differently but share the same technical essence.

For example, during a system information acquisition by UE, in the process that the UE acquires system information in an on-demand mode or that the UE acquires on-demand system information, the following applies: the UE may reset the MAC layer if a random access problem indication is received.

For example, when a random access problem occurs in a random access procedure triggered by the system information acquisition, actions performed by the UE may include resetting the MAC layer.

For example, in the process of system information acquisition by UE, when the UE acquires system information in an on-demand mode or the UE acquires on-demand system information, the following applies: the UE may reset the MAC layer when cell reselection occurs.

For example, in the process of system information acquisition by UE, when the UE acquires system information in an on-demand mode or the UE acquires on-demand system information, the following applies: when UE receives a random access problem indication or when reception of the system information expires, it is declared that the system information is unsuccessfully acquired or it is judged that the system information is unsuccessfully acquired. Actions performed by the UE when or after it is declared/judged that the system information is unsuccessfully acquired may include resetting the MAC layer. The reception of the system information expiration referred herein may mean that the system information is not correctly received after a plurality of system information windows elapse (the system information or scheduling of the system information is included in the system information window), or that the system information is not correctly received after a predefined number of system information windows elapse, or that the system information is not correctly received within a specific time window. A counter may also be used to count the number of received system information windows. When the counter reaches or exceeds the maximum allowable number and yet the system information is not correctly received, it is determined that the reception of the system information is expired. A count-down method may be adopted in the counter. For example, the counter value decreases by 1 each time a system information window is received. If the system information is not correctly received when the counter value becomes 0, it is determined that the reception of the system information is expired. The predefined number or specific time window and counter-related value here may be notified to the UE through system information broadcast or through dedicated signaling.

Embodiment 6

The resetting the MAC layer in the aforementioned embodiment may include, but is not limited to, one or more of the following operations:

discarding information related to a preamble transmitted in the random access procedure, such as the preamble or a preamble sequence number. The information related to the preamble may be instructed/notified through signaling, instructed/notified to the MAC layer by an upper layer (for example, an RRC layer), or instructed/notified through internal signaling;

discarding information related to a random access resource used in the random access procedure, such as an RACH time-frequency resource used in this random access or a resource sequence number. The information related to the random access resource mentioned herein may be instructed/notified through signaling, may be instructed/notified to the MAC layer by the upper layer (for example, the RRC layer), or may be instructed/notified through internal signaling;

flushing a buffer of the UE, where the buffer may be a buffer for an HARQ, or a buffer for storing the preamble, or a buffer for Message 3;

stopping all running timers, for example, all timers running at the MAC layer;

stopping all ongoing random access procedures; or releasing a network identifier of the UE and related information thereof, for example, a temporary cell radio network temporary identifier (Temporary C-RNTI).

When only some of the aforementioned operations is included, the resetting the MAC layer may be referred to as partially resetting the MAC layer. The MAC layer may be partially reset using only several operations/actions described above.

In some examples, when the MAC layer receives an instruction of reset from the upper layer, the MAC layer may further judge the cause of reset, such as judging whether the reset is caused by unsuccessful acquisition of the system information according to the type of the transmitted preamble. In some examples, while the upper layer instructs a reset, it may further be indicated that the reset is caused by unsuccessful acquisition of the system information. That is, the upper layer may instruct the MAC to perform a reset caused by unsuccessful acquisition of the system information, and the MAC performs the corresponding reset action.

The MAC layer may further perform the reset action according to the cause of triggering random access. Specifically, for example, random access may be triggered because of acquisition of system information, and the MAC performs the corresponding reset action when receiving a reset instruction.

Embodiment 7

In the process of acquiring system information based on Message 3, when a contention-conflict is resolved but the UE receives does not receive from the network side an acknowledgment for its request for system information (for example, in Message 4), or when the UE receives from the network side (for example, in Message 4) an instruction of delaying/prohibiting transmission of a system information request and the instruction includes information related to a duration of delaying/prohibiting transmission, the UE may instruct an upper layer to delay transmission (for example, an RRC layer), or may instruct the upper layer information related to the duration of delaying/prohibiting transmission. The upper layer may stop a first timer and reset a MAC layer after receiving the instruction. In some examples, actions performed by the UE when the first timer is stopped may also include resetting the MAC layer, that is, the MAC layer may be indirectly reset when the first timer is stopped. The UE may optionally initiate a third timer, where a duration of the third timer may be configured according to the information as instructed related to the duration of delaying/prohibiting transmission, or configured according to content broadcast in the system information, and acquisition of the system information is stopped (for example, a system information request message is not sent) during initiation of the third timer. When the third timer expires, the UE may reinitiate the flow of acquiring system information (e.g. the flow in Embodiment 2). For example, the first timer may be initiated again; or, the MAC layer may be reset when the first timer expires.

In particular, the third timer and the second timer may be the same or different. For example, durations set for the third timer and the second timer may be different. For example, the duration of the second timer may be broadcast as X in the system information, and the duration of the third timer may further be broadcast as Y. Optionally, the value of Y may also be learned from the information related to the duration of delaying/prohibiting transmission as instructed by the network side/base station.

The third timer and the second timer may be implemented using the same timer through, for example, different parameter settings. For example, when the case in Embodiment 3 occurs, that is, a random access problem indication related to unimportant information is received, the duration of the timer may be set to the duration X of the second timer, and the timer is initiated. When the case in Embodiment 6 occurs, that is, a request for delaying/prohibiting transmission instructed by the network side/base station is received, the duration of the timer may be set to the duration Y of the third timer.

Embodiment 8

Figure 2:
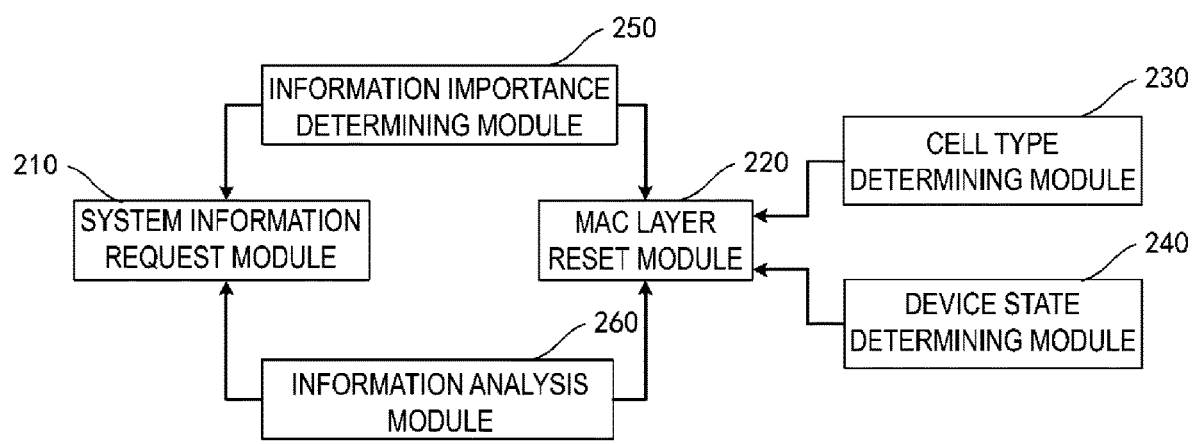
FIG. 2 is a schematic block diagram of an apparatus for resetting a medium access control (MAC) layer at user equipment (UE) according to an embodiment of the present invention.

FIG. 2 illustrates an apparatus for resetting a medium access control (MAC) layer at user equipment (UE) according to an embodiment of the present invention. The apparatus corresponds to the method in the aforementioned embodiments (especially Embodiment 1).

As shown in FIG. 2, the apparatus includes a system information request module 210 and a MAC layer reset module 220. The system information request module 210 is configured to transmit a system information request message for requesting system information to a network side through a random access procedure. The MAC layer reset module 220 is configured to reset the MAC layer when the system information is unsuccessfully requested.

In some examples, the MAC layer reset module 220 may further be configured to reset the MAC layer if no acknowledgment related to the system information request message is received from the network side within a predefined time period. Optionally, the predefined time period described above may be implemented using a timer, such as using a timer of an RRC layer. The time period begins when the timer is initiated; the time period ends when the timer expires; and the time period is suspended when the timer is stopped.

In some examples, the MAC layer reset module 220 may further be configured to reset the MAC layer if a random access problem occurs in the random access procedure. Herein, as described above, the random access problem may refer to any problem causing failure of the random access procedure.

In some examples, the MAC layer reset module 220 may further be configured to directly reset the MAC layer if the UE performs cell reselection during the predefined time period. However, in some other examples, different processing modes may exist. For example, the apparatus shown in FIG. 2 may further include a cell type determining module 230 configured to judge whether a reselected cell is an inaccessible or barred cell when cell reselection occurs during the predefined time period. In this case, the MAC layer reset module 220 may further be configured to reset the MAC layer when the reselected cell is an inaccessible or barred cell.

In some examples, the predefined time period begins at one of the following moments (that is, the corresponding timer is initiated at one of the following moments):
  when transmission of the system information request message is triggered;
  when a preamble for requesting system information is transmitted;
  when initialization of the random access procedure by a lower layer is triggered;
  when initialization of a preamble transmission procedure by the lower layer is triggered;
  when transmission of the preamble is instructed to the lower layer; or
  when the MAC layer instructs acquisition of the system information to an RRC layer.

In some examples, whether or not to enable the predefined time period (for example, whether to initiate the corresponding timer) may depend on the current state of the UE. For example, the apparatus shown in FIG. 2 may further include a device state determining module 240 configured to determine the current state of the UE. The predefined time period may be enabled in the MAC layer reset module 220 when the UE is in an Idle state or Inactive state, and the predefined time period may not be enabled in the MAC layer reset module 220 when the UE is in a Connected state, or vice versa.

In some examples, the enabling of the predefined time period may further be based on the type of the system information request message. For example, the predefined time period may be enabled in the MAC layer reset module 220 if the system information request message is Message 1, and the predefined time period may not be enabled in the MAC layer reset module 220 if the system information request message is Message 3, and vice versa.

In some examples, the MAC layer reset module 220 may perform at least one of the following operations:
  discarding information related to a preamble transmitted in the random access procedure;
  discarding information related to a random access resource used in the random access procedure;
  flushing a buffer of the UE;
  stopping all timers running at the MAC layer;
  stopping all ongoing random access procedures; or
  releasing a network identifier of the UE and related information thereof.

The MAC layer reset module 220 performing only some of the aforementioned operations may be referred to as that the MAC layer reset module 220 performs the operation of partially resetting the MAC layer.

In some examples, the apparatus shown in FIG. 2 may further include an information importance determining module 250 configured to determine the importance of the system information to be acquired. When it is determined that the system information to be acquired is information of lower importance, the predefined time period may be suspended in the MAC layer reset module 220, and the request for the system information may be stopped in the system information request module 210. Moreover, the system information request module 210 reinitiates the request for the system information after a second predefined time period. Similarly, the second predefined time period herein may be implemented by, but is not limited to, a timer (a second timer).

In some examples, the aforementioned system information request message is Message 3 in a Long Term Evolution (LTE) random access procedure. In this case, the apparatus shown in FIG. 2 may include an information analysis module 260 configured to determine whether an acknowledgment for the system information request is received from the network side, or an instruction of delaying/prohibiting transmission of the system information request message is received from the network side, where the instruction may include information related to a duration of delaying/prohibiting transmission. When no acknowledgment for the system information request is received from the network side, or when the instruction of delaying/prohibiting transmission of the system information request message is received from the network side, the predefined time period may be suspended in the MAC layer reset module 220, and the request for the system information may be stopped in the system information request module 210. The method may further include reinitiating the request for the system information in the system information request module 210 after a third predefined time period corresponding to the information related to the duration of delaying/prohibiting transmission. Similarly, the third predefined time period herein may be implemented by, but is not limited to, a timer (a third timer). The description will not be provided herein again.

Embodiment 9

Figure 3:
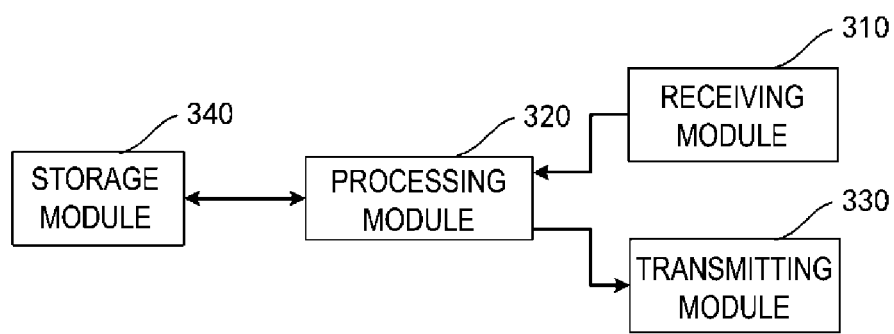
FIG. 3 is a schematic block diagram of a network-side device according to an embodiment of the present invention.

FIG. 3 is a schematic block diagram of a network-side device according to an embodiment of the present invention.

As shown in FIG. 3, the network-side device (for example, a base station) includes a receiving module 310, a processing module 320, and a transmitting module 330. The receiving module 310 is configured to receive a system information request message from user equipment. The processing module 320 is configured to process the received system information request message and generate a corresponding response message. The transmitting module 330 is configured to transmit the generated response message. For example, the generated response message may include, for example, the system information requested by the user equipment.

The network-side device shown in FIG. 3 may further include a storage module 340 configured to store various information required by network-side operations, such as system information requested by various user equipment or any other information.

In some examples, the information stored in the storage module 340 may include information related to delaying/prohibiting transmission of the system information request message and a duration thereof. The processing module 320 may generate, based on the information, an instruction of delaying/prohibiting transmission of the system information request message, and the instruction is sent by the transmitting module 330, where the instruction may include information related to a duration of delaying/prohibiting transmission.

In some examples, the processing module 320 may further generate an acknowledgment for the system information request message based on the received system information request message, and the acknowledgment is sent by the transmitting module 330.

For simplicity of description, the embodiment described above based on FIG. 2 or FIG. 3 illustrates only the functions and/or modules required for implementing the embodiments of the present invention. In specific implementation of the apparatus and device according to the embodiments of FIG. 2 and FIG. 3, any other required apparatus, such as a display, a memory, or a user access interface, may also be added. The embodiments of the present invention are not limited by the specific structure and form of the specific apparatus and device. In addition, the storage module 340 in FIG. 3 may also not be in the device shown in FIG. 3, but in a remote device far from the device shown in FIG. 3 and in communication connection with the device. Or, data stored in the storage module 340 may be distributed in a plurality of different devices in communication connection with the device shown in FIG. 3.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The so-called "computer system" may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in the present specification may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies replacing existing integrated circuits emerge from advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors such as the following may be used as terminal devices or communications devices: AV equipment, kitchen equipment, cleaning equipment, air conditioners, office equipment, vending machines, and other household appliances.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced one with another.

The invention claimed is:

1. A user equipment (UE) comprising:
control circuitry configured to initiate a random access procedure for a system information request by a transmission of a preamable; and
reception circuitry configured to receive an acknowledgement for the system information request, wherein
the control circuitry is configured to reset a MAC layer, in a case that a cell reselection occurs in a state where the acknowledgement for the system information request is not received after the transmission of the preamable during the random access procedure.

2. The user equipment according to claim 1, wherein
the control circuitry is configured to stop a running timer, flush a buffer, and release a UE identity if the MAC layer is reset.

3. A method performed by a user equipment (UE) including:
initiating a random access procedure for a system information request by a transmission of a preamble;
receiving an acknowledgement for the system information request; and
resetting a MAC layer, in a case that a cell reselection occurs in a state where the acknowledgement for the system information request is not received after the transmission of the preamble during the random access procedure.

4. The method according to claim 3, wherein
the method includes stopping a running timer, flushing a buffer, and releasing a UE identity if the MAC layer is reset.

* * * * *